O. W. WARD.
MAILING CASE FOR EGGS.
APPLICATION FILED MAY 2, 1914.
1,149,877.
Patented Aug. 10, 1915.
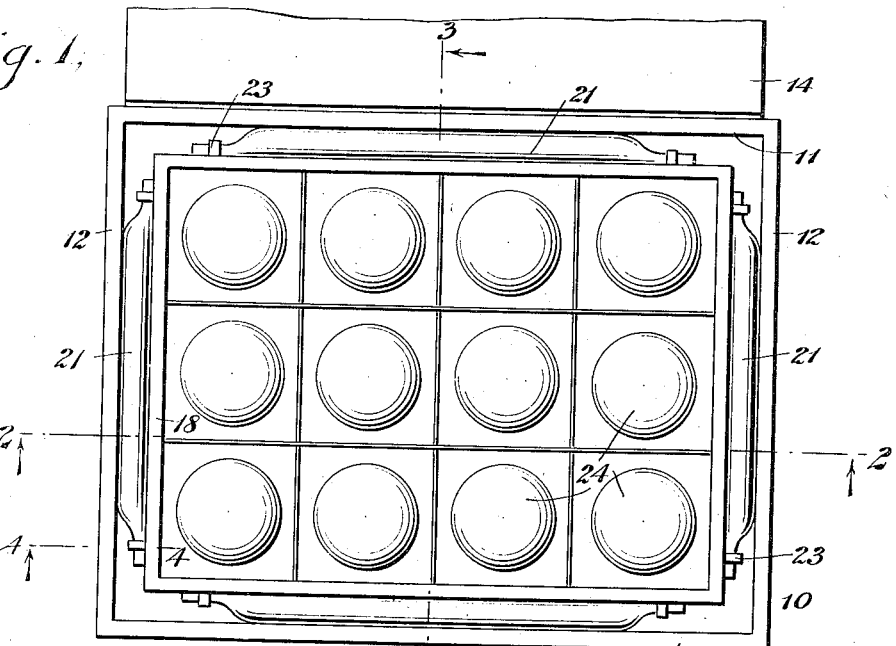
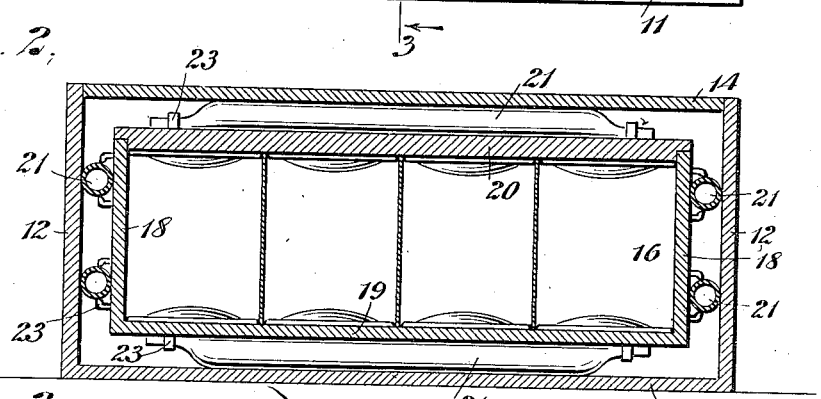
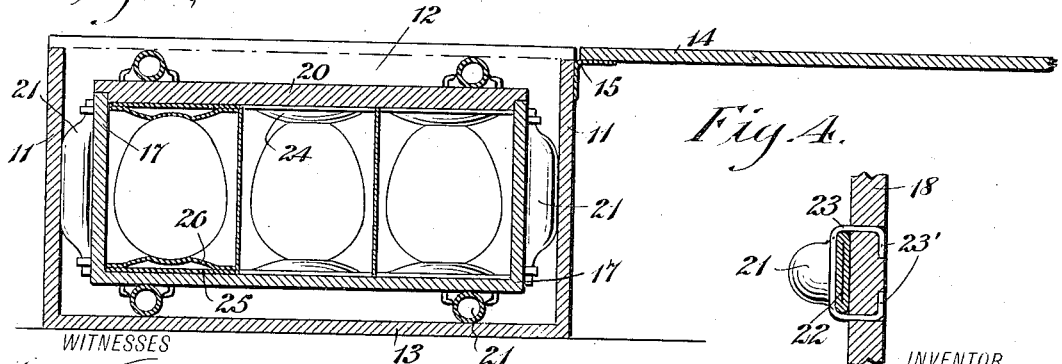
WITNESSES
Edw. Thorpe
Geo. L. Beeler
INVENTOR
Orin W. Ward
BY Munn & Co.
ATTORNEYS

UNITED STATES PATENT OFFICE.

ORIN W. WARD, OF NEW YORK, N. Y.

MAILING-CASE FOR EGGS.

1,149,877. Specification of Letters Patent. Patented Aug. 10, 1915.

Application filed May 2, 1914. Serial No. 835,894.

*To all whom it may concern:*

Be it known that I, ORIN W. WARD, a citizen of the United States, and a resident of the city of New York, borough of Manhattan, in the county and State of New York, have invented a new and Improved Mailing-Case for Eggs, of which the following is a full, clear, and exact description.

This invention relates to shipping and storing vessels, and has particular reference to the shipment of commodities by parcel post, express or the like.

Among the objects, therefore, of this invention is to provide a package or container of such a nature as to make the shipment of fresh eggs through the mails a practical expedient.

Another object of the invention is to provide a shipping case of a comparatively cheap construction and having the requisite strength and resiliency for the contents to make such shipment safe and dependable and at a reasonable cost.

The foregoing and other objects of the invention will hereinafter be more fully described and claimed and illustrated in the drawings forming a part of this specification in which like characters of reference indicate corresponding parts in all the views, and in which—

Figure 1 is a plan view of a mailing case made in accordance with this invention, the outside cover being open and broken away; Fig. 2 is a vertical section of the same on the line 2—2 of Fig. 1 but with the outside cover closed; Fig. 3 is a vertical transverse section on the line 3—3 of Fig. 1; and Fig. 4 is a sectional detail on the line 4—4 of Fig. 1.

The several parts of the device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings, I show an outside shell or casing 10 having closed sides 11, ends 12 and bottom 13. The top 14 is preferably hinged along one edge at 15 so as to either lie open or be folded in the closed position whereby it may be secured by any suitable fastening devices.

An inner casing 16 of the same general form as the outside casing is arranged with the corresponding parts all in spaced relation to the inner walls of the outside casing. The inner casing comprises side walls 17, end walls 18, a bottom 19, and a removable cover or lid 20. Like the outside casing, the side, end and bottom walls of the inner casing are preferably secured permanently together. The inner lid 20 is preferably fitted into the upper portion of the outside casing without hinges, whereby it may be removed bodily from the inner casing.

I provide between the inner and outer casings a peculiar form of pneumatic cushioning devices, the same preferably being composed of a plurality of sections of tubing 21. These pieces of tubing are cut according to the length of the parts to which they are connected in a straight form, each of the sections approximating substantially the full length of the wall or side to which it is connected permanently by any suitable means.

The means I prefer to employ for the purpose of securing the pneumatic cushions in place comprises a modicum of glue or cement 22 inserted into each open end of the tube 21 and then I apply a staple 23 across such end where the glue is applied, the free ends 23′ of each staple being then passed through the wall and clenched as shown in Fig. 4, making a neat connection and one which will positively hold the end of the tube sealed hermetically as well as holding the tube as a whole in place to the wall. Both ends of each tube being thus sealed, the section of tubing constitutes an effective and reliable pneumatic cushion. I employ preferably two of such cushions in connection with the outer face of each wall portion of the inner casing, though a greater or less number may be employed.

The inner casing obviously is adapted for carrying any sort of commodity which is mailable under the existing postal laws, but the device is designed especially for the transportation of fresh eggs. I may provide, therefore, any suitable filling means within the inner casing for spacing the individual eggs from one another. I also may employ, either within or without the inner casing, a pneumatic cushioning device in the form of a wafer 24, the same being adapted to be glued along one side 25 to the casing wall and having a flexible side 26 for immediate contact with the egg. The parts 25 and 26 of each wafer cushion 24 are spaced from each other at their centers but have their rims permanently sealed hermetically for the purposes of the invention. These wafer cushions may be secured at any desired points and preferably a plurality of them coöperate with each egg, holding it in definite position resiliently within the inner casing.

Having thus described my invention, I claim as new and desire to secure by Letters Patent:—

The combination, in a mailing case, with inner and outer rigid casings spaced from each other, of a plurality of hermetically sealed pneumatic cushioning devices secured to one of the casings within the space between the two casings, each cushioning device comprising a section of flexible cylindrical tubing having the interior of each end supplied with a modicum of glue, and a staple spanning such end and causing the glue to set and serving to hold such end of the tubing in position.

In testimony whereof I have signed my name to this specification in the presence of two subscribing witnesses.

ORIN W. WARD.

Witnesses:
  GRACE L. WILKINSON,
  FREDERIC A. LOASE.